United States Patent [19]

Tanibata

[11] Patent Number: 5,428,422
[45] Date of Patent: Jun. 27, 1995

[54] IMAGE PRINTER
[75] Inventor: Tohru Tanibata, Wakayama, Japan
[73] Assignee: Noritsu Koki Co. Ltd., Wakayama, Japan
[21] Appl. No.: 208,763
[22] Filed: Mar. 9, 1994
[30] Foreign Application Priority Data Mar. 12, 1993 [JP] Japan .................................. 5-051604

[51] Int. Cl.⁶ .............................................. G03B 27/52
[52] U.S. Cl. .......................................... 355/40; 355/32; 355/39; 355/71; 355/212; 358/400
[58] Field of Search ........................ 355/32, 39, 40, 41, 355/71, 89, 212; 358/400

[56] References Cited

U.S. PATENT DOCUMENTS

| | | | |
|---|---|---|---|
| 4,366,499 | 12/1982 | Mir . | |
| 4,727,380 | 2/1988 | Miura et al. | 346/108 |
| 4,769,694 | 9/1988 | Oshikoshi . | |
| 4,866,593 | 9/1989 | Miura et al. | 346/107 |
| 4,933,773 | 6/1990 | Shiota et al. | 355/32 X |
| 5,012,346 | 4/1991 | DeJaeger et al. | 355/71 X |
| 5,122,831 | 6/1992 | Suzuki . | |
| 5,184,227 | 2/1993 | Foley . | |
| 5,225,900 | 7/1993 | Wright | 355/32 X |
| 5,309,245 | 5/1994 | Hayashi et al. | 355/40 X |

FOREIGN PATENT DOCUMENTS 3-58096 4/1983 Japan .
1-291236 5/1988 Japan .

OTHER PUBLICATIONS

Patent Abstracts of Japan, vol. 14, No. 317 (P-1073) 9 Jul. 1990 & JP-A-02 103 524 (Fuji Photo Film) 16 Apr. 1990; abstract.
Patent Abstract of Japan vol. 12, No. 348 (E-659) 19 Sep. 1988 & JP-A-63 105 584 (Kawasaki Heay Ind.) 10 May 1988; abstract.

Primary Examiner—Richard A. Wintercorn
Assistant Examiner—Daniel P. Malley
Attorney, Agent, or Firm—Townsend & Townsend Khourie and Crew

[57] ABSTRACT

An image printer includes a projection-exposure section for projecting and exposing a film image onto a photosensitive material, an image-exposure section for exposing the photosensitive material based on exposing image information with setting an exposure amount for each of a plurality of areas of the exposing image information, and a reader device for reading the image information of the film image with the image information being divided into the plurality of areas. The image-exposure section generates the exposing image information through composition of the plurality of areas of the image information read by the reader device, image information stored in advance in the image-exposure section and of further image information inputted from another input device.

14 Claims, 4 Drawing Sheets

IMAGE PRINTER

BACKGROUND OF THE INVENTION

1. FIELD OF THE INVENTION

The present invention relates to an image printer, and more particularly to an image printer including a projection-exposure section for projecting and exposing a film image onto a photosensitive material and an image-exposure section for exposing the photosensitive material based on exposing image information with setting an exposure amount for each of a plurality of areas of the exposing image information.

2. DESCRIPTION OF THE RELATED ART

According to the above-described type of image printer, the projection-exposure of the film image may be effected at a high speed at the projection-exposure section. Whereas, the image-exposure section may effect such special processing as image composition, though at a lower speed since this image-exposure section has to process the information of the great number of areas.

As the image composition processing, there is known the art of effecting double-exposure, i.e. the projection-exposure of the film image at the projection-exposure section and the further exposure of e.g. character data at the image-exposure section in an overlapping manner on a same portion of the photosensitive material (Japanese published patent gazette Hei. 3-58096 and Japanese laid-open patent gazette Hei. 1-291236).

According to the above-described prior art, however, color development of the double-exposed portion of the photosensitive material is difficult because of the double-exposure of the colors through the two times of exposures. Hence, it has been difficult to obtain desired colors on the photosensitive material.

The present invention attends to the above-described state of the art. A primary object of this invention is to provide an image printer capable of developing desired colors in a composite image on a photosensitive material based on image information of a film image without sacrificing the advantage of the projection-exposure section of the film image, i.e. its high-speed projection-exposure processing.

SUMMARY OF THE INVENTION

For fulfilling the above-described object, an image printer, according to the present invention, comprises:
- a projection-exposure section for projecting and exposing a film image onto a photosensitive material;
- an image-exposure section for exposing the photosensitive material based on exposing image information with setting an exposure amount for each of a plurality of areas of the exposing image information; and
- reader means for reading the image information of the film image with the image information being divided into the plurality of areas;
- wherein the image-exposure section generates the exposing image information through composition of the plurality of areas of the image information read by the reader means, image information stored in advance in the image-exposure section and of further image information inputted from input means.

According to the above-described construction, in case a situation requires only projection-exposure of the film image, this is done at a high-speed at the projection-exposure section. On the other hand, in the case of an image composing operation based on the film image, the reader means reads the image information of the film image and then the image-exposure section composes exposing image information based on the read image information and exposes the photosensitive material based on the composed exposing image information.

The exposing image information includes, for example, composition of image information of the plurality of film images read by the reader means, or composition of the image information of the film image read by the reader means and further image information inputted by means of e.g. an image scanner provided separately of the reader means and capable of reading and inputting any image information.

In the image composition described above, a variety of desired settings are possible as to which image data should be provided with priority over the other, or to processing of the two kinds of the image information, e.g. a see-through processing in which either one kind of the image information is rendered semitransparent.

As described above, with the construction of the present invention, when the projection-exposure of the film image alone is needed, this is done at a high speed at the projection-exposure section. Whereas, when an image composition based on the film image is needed, this image composition processing is done by reading the film image by means of the reader means. Consequently, the invention has achieved the intended object of providing an image printer capable of developing desired colors in a composite image on a photosensitive material based on image information of a film image without sacrificing the advantage of the projection-exposure section of the film image, i.e. its high-speed projection-exposure processing.

According to one aspect of the invention, the image printer having the above-described construction further comprises:
- transporter means for transporting the photosensitive material through the projection-exposure section and the image-exposure section;
- a control unit for controlling operations of the projection-exposure section, the image-exposure section and the transporter means; and
- an exposure-mode instructing means for instructing the control unit to switch over between a projection-exposure mode and an image-exposure mode;
- wherein, when the exposure-mode instructing means instructs the projection-exposure mode, the control unit effects a control scheme to allow the photosensitive material to be exposed at the projection-exposure section alone; and,
- when the exposure-mode instruction means instructs the image-exposure mode, the control unit effects a further control scheme to allow the photosensitive material to be exposed at the image-exposure section alone.

According to the above-described construction, the transporter means transports the photosensitive material through the projection-exposure section and the image-exposure section under the control of the control unit. Then, in the course of this, if the exposure-mode instructing means provides the instruction for the projection-exposure mode, the photosensitive material is exposed only at the projection-exposure section. Whereas, if the exposure-mode instructing means provides the instruction for the image-exposure mode, the photosensitive material is exposed only at the image-exposure section.

With the above-described construction, while the transporter means is transporting the photosensitive material through the projection-exposure section and the image-exposure section, with the switch-over instruction from the exposure-mode instruction means, the projection-exposure section alone is activated in case only the projection-exposure of the film image is necessary. On the other hand, in the case of the image composition processing, only the image-exposure section is activated. In this way, it has become possible to diversify the exposure processing of the film image onto the photosensitive material without increasing the troubles of the operations. So that, the image printer having these additional features will prove more convenient.

According to a further aspect of the invention, the image-exposure section is rendered switchable between a composite mode in which the plurality of the image information are composed with each other to generate the exposing image information and a non-composite mode in which pre-stored image information or image information inputted by a further input means is used as the exposing image information. The exposure-mode instructing means is operable to instruct a double-exposure mode in addition to the projection-exposure mode and the image-exposure mode. Such that, with an instruction for the double-exposure mode, the control unit effects a still further control scheme in which the photosensitive material is subjected to the exposure at the projection-exposure section and a further exposure under the non-composite mode at the image-exposure section in an overlapping manner.

According to the above construction, in case the exposure-mode instructing means instructs the projection-exposure mode or the image-exposure mode, the operations are effected in the same manner as the previously described construction. On the other hand, in case the exposure-mode instructing means instructs the double-exposure mode, the image-exposure section is switched to the non-composite mode of the two modes of the composite mode and he non-composite mode, so that the photosensitive material is subjected to the exposure of the film image at the projection-exposure section and the further exposure at the image-exposure section under the non-composite mode in which the pre-stored image information or the image information inputted to the separate input means.

With this further feature for allowing the double exposure of the photosensitive material consisting of the exposure at the projection-exposure section and of the further exposure at the image-exposure section, the image printer will provide further convenience.

Further and other objects, features and effects of the invention will become apparent from the following more detailed description of the embodiments of the invention with reference to the accompanying drawings.

DESCRIPTION OF THE PREFERRED EMBODIMENTS

Preferred embodiments of the present invention will be described in particular with reference to the accompanying drawings.

Figure 1:
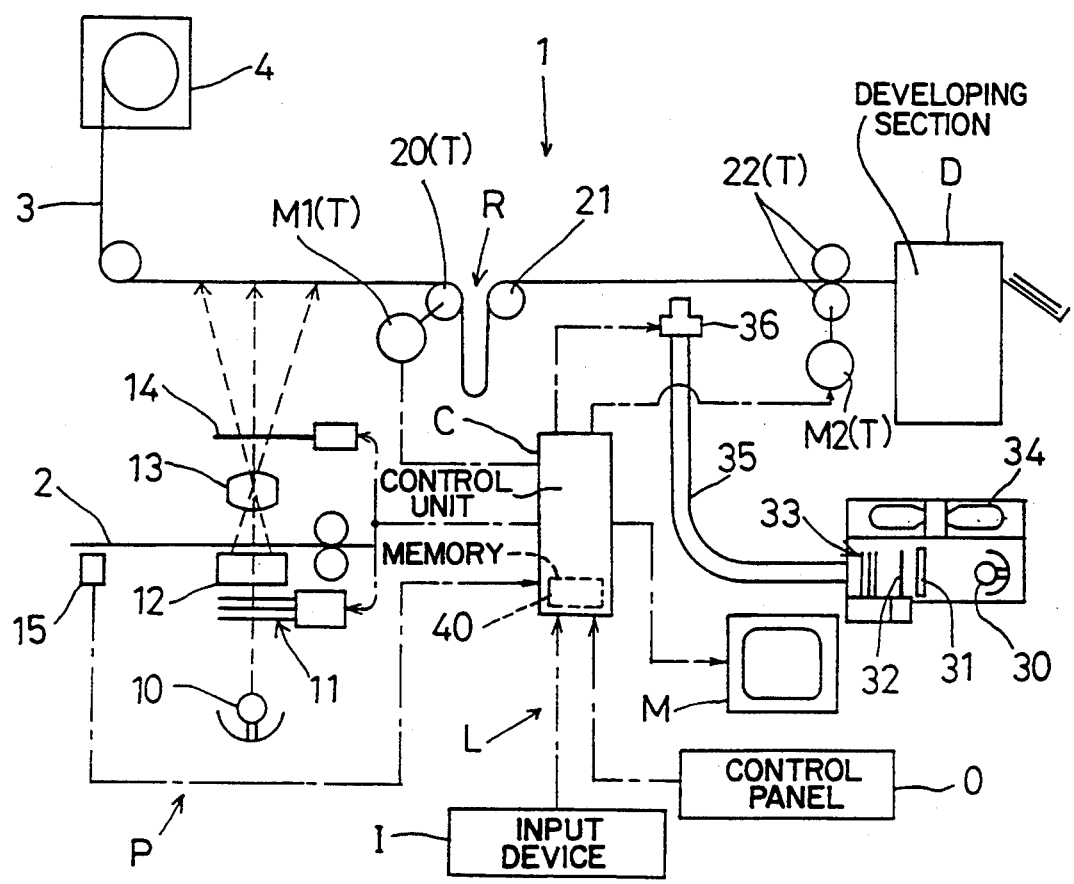
FIG. 1 is a schematic view showing a construction of an image printer according to one preferred embodiment of the present invention.

As shown in FIG. 1, an image printer 1 includes a projection-exposure section P for projecting and exposing image information of a film 2 onto a print paper 3 as a photosensitive material, an image-exposure section L for exposing onto the print paper 3 each line of image information divided into a plurality of lines, a loop forming unit R for forming the print paper 3 into a loop so as to allow transportation of the print paper 3 at the projection-exposure section P and at the image-exposure section, independently of each other, a developing section D for developing the print paper 3 having been exposed at either the projection-exposure section P or the image-projection section L, and a control unit C for controlling operations of the above-listed components of this image printer 1. The control unit C is connected to an input device I acting as an input means for inputting image information for image composition, a control panel O for inputting various instructions and setting various operation modes and also to a monitor device M for displaying the image information.

The print paper 3 is withdrawn from a print-paper holder 4 in which the paper 3 is stored in a rolled state. Then, this withdrawn print paper 3 is exposed at either the projection-exposure section P or the image-exposure section L and then is developed at the developing section D. Then, the developed print paper is cut into a strip of paper including one-frame amount of image information and exhausted from the printer.

The image printer 1 provides two modes of a projection-exposure mode and an image-exposure mode. In the projection-exposure mode, the print paper 3 is subjected to exposure of the image of the film 2 at the projection-exposure section alone. In the image-exposure mode, the print paper 3 is subjected to exposure at the image-exposure section alone of further image information relating to an image composition to be described later. Which of these two modes to be effected is selected by inputting an instruction from the control panel O as described above.

Next, the respective components will be specifically described.

The projection-exposure section P includes a projection-exposure light source 10, a light-modulating filter 11 for adjusting color balance of light beam to be irradiated onto the film 2, a mirror tunnel 12 for uniformly mixing the light having passed the light-modulating filter 11, a printing lens 13 for forming an image of the film 2 onto the print paper 3, and a shutter 14, with all these components being disposed along a common optical axis.

On the upstream side in the film transport path of the film 2 at the projection-exposure section P, there is provided an image sensor 15 acting as a reader means for reading the image information of the film 2 with the image information being divided into a great number of areas. This image sensor 15 is operable to irradiate white light onto the film 2 and measuring, by e.g. a CCD line sensor, intensity of its reflected or transmission light, with the light being decomposed into three primary colors of red, green and blue. Then, the image information read by the image sensor 15 is utilized for both the exposure at the projection-exposure section P and the exposure at the image-exposure section L.

At the projection-exposure section P, based on the image information of the film 2 read by the image sensor 15, the control unit C controls the light-modulating filter 11 to adjust the irradiating light of the projection-exposure light source 10 to a color balance according to the color densities of the image of the film 2, so that this adjusted light is irradiated onto the film 2 to print the image of the film 2 onto the print paper 3.

The loop forming unit R includes rollers 20, 21 for transporting the print paper 3 and a motor M1 for rotatably driving the roller 20. Between the roller 20 on the upstream side of the transport direction of the print paper and the roller 21 on the downstream side of the transport direction of the print paper, thought not shown, there is disposed a flap switchable between a condition for guiding the print paper 3 between the rollers 20, 21 in a straight manner and a further condition for allowing the print paper 3 to be formed into a loop. Then, with formation of the loop, it is possible to set a transport speed of the print paper 3 at the projection-exposure section P and a transport speed of the same at the image-exposure section L, independently of each other.

The image-exposure section L includes an exposure light source 30, an IR cut filter 31 for eliminating infrared beam component from the light emitted from the light source 30, a shutter 32, a light-modulating filter 33 for adjusting color balance of the light emitted from the light source 30, a PLZT print head 36, and an optical fiber bundle 35. The exposure light source 30, the IR cut filter 31, the shutter 32, and the light-modulating filter 33 together with a cooling fan motor 34 are accommodated within a single casing.

The light-modulating filter 33 includes color filters of Y (yellow), M (magenta) and C (cyan), with these color filters being projectable into and retractable from the optical path. In operation, with selective projection/retraction of the respective color filters, the light beam emitted from the exposure light source 30 is switchable to an exposing color of red, green, blue or the like.

The PLZT print head 36, though not shown, includes a plurality of assemblies each consisting of PLZT element disposed between a polarizer and an analyzer, with the assemblies being linearly disposed side by side in a direction perpendicular to the transport direction of the print paper 3. Then, by varying a voltage to be impressed between a pair of electrodes attached to each PLZT, the polarizing direction of the light beam passing between the electrodes is varied, so that the respective PLZT selectively allows or inhibits transmission of the light therethrough. In this manner, the PLZT acts as a light shutter.

In operation, through the independent control of the voltages to be applied to the plurality of PLZT elements, the light-modulating filter 33 is switched to a desired one of the exposing colors corresponding to the three primary colors of red, green and blue. With this, an exposure amount is set for each of the plurality of areas of one-line amount of the image information, thereby to effect color exposure of the print paper 3.

On the downstream side of the print paper transport path at the image-exposure section L, there are provided a roller 22 for transporting the print paper 3 and a motor M2 for driving the roller 22.

When the print paper 3 is exposed in succession at the image-exposure section L with one-line amount of image information while switching over the exposing color, the motor M2 and the roller 22, under the control by the control unit C, repeatedly effect an operation for transporting the print paper 3 by a distance corresponding to one line amount, while shifting the image information by one line amount, thereby to expose one-frame amount of image information onto the print paper 3.

The developing section D, though not shown, includes a plurality of tanks filled with processing liquid for developing the exposed print paper 3. Then, the print paper 3 is developed through its successive passage through the tanks.

The input device I comprises an image scanner for scanning and reading the various kinds of image information, with the information being divided into a great number of areas. Then, the input device converts the read information into density information of the three primary colors of red, green and blue for each area and transmits this information to the control unit C. Incidentally, the input device I may include a control panel for allowing input of characters, marks or the like.

The control unit C includes a memory 40 for storing a program for controlling the operations of the various components and a variety of image information including the image information inputted from the input device I, the image information read by the image sensor 15, and the exposing image information generated through an image composition.

Figure 2:
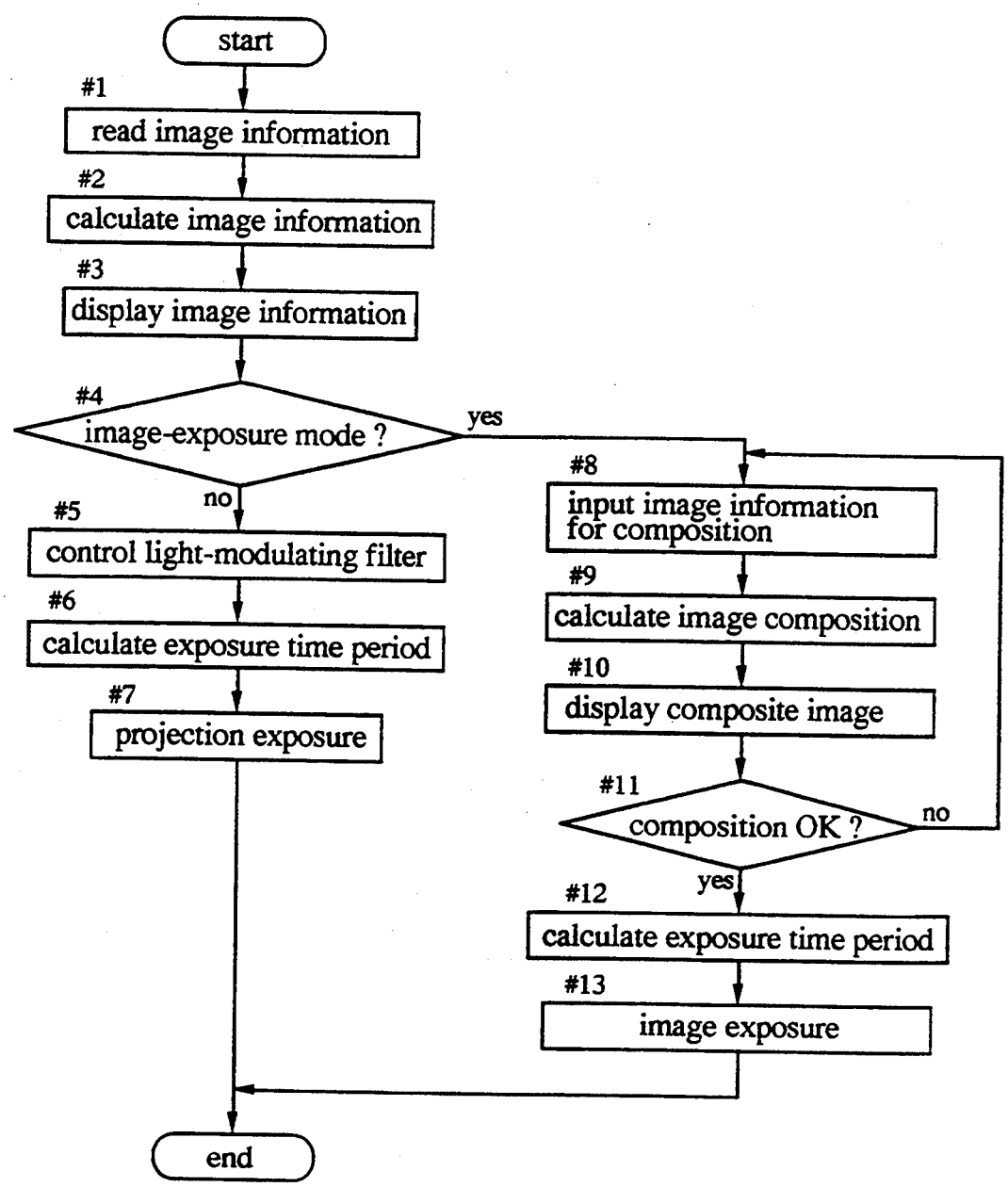
FIG. 2 is a flow chart relating to the embodiment of FIG. 1.

Next, the operations of the control unit C for controlling the respective components will be described with reference to the flow chart of FIG. 2.

First, the image information of the film 2 introduced to the projection-exposure section P is read by the image sensor 15 as the information concerning densities of the three primary color components of red, green and blue (step #1). The density information is then calculated to convert the same into data to be displayed on the monitor device M (step #2). In this, in case the film 2 comprises a negative film, the read density information concerning the three primary color components need to be converted into density information of complementary colors of the respective color components.

With completion of the above-described calculation, based on the result of this calculation, the image information is displayed on the monitor device M (step 3).

Then, it is judged whether the operation mode of the image printer 1 is presently set to the image-exposure mode or to the projection-exposure mode (step #4). If the mode is set to the projection-exposure mode, by utilizing the result of the calculation effected at step #2, the light-modulating filter 11 is controlled to be adjusted for the optimal color balance (step #5).

Thereafter, by utilizing the result of the calculation effected at step #2, the exposure time period is calculated (step #6). Then, based on the result of calculation of the exposure time period, the shutter 14 is activated to expose the print paper 3 (step #7).

On the other hand, if it is judged at step #4 that the operation mode is presently set to the image-exposure mode, image information to be composed with the image information previously read by the image sensor 15 and stored at the memory 40 is inputted from the input device I to the memory 40 to be stored therein.

Figure 3A:
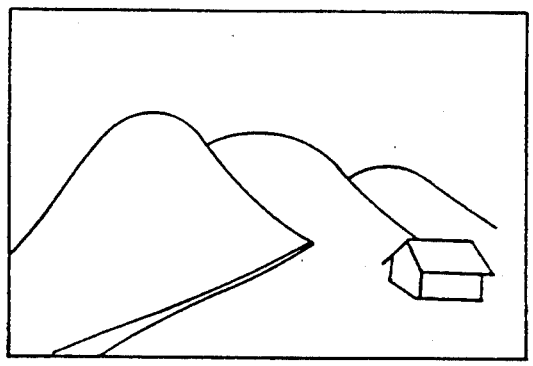
FIGS. 3A, 3B and 3C show examples of image composition relating to the embodiment of FIG. 1.
Figure 3B:
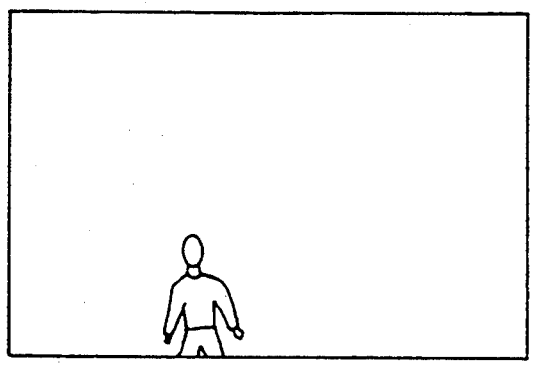
Figure 3C:
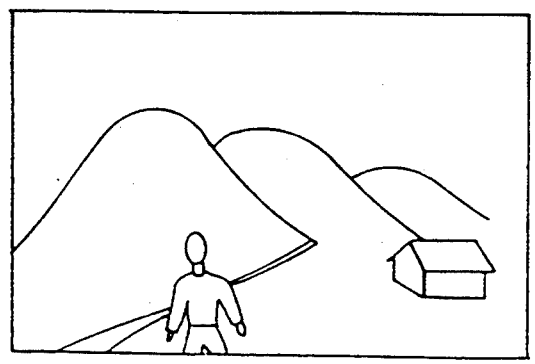

With the input of the further image information from the input device I, a calculation is effected for composing the inputted further image information with the image information of the film image. For instance, if the film image read by the image sensor 15 is an image of landscape as shown in FIG. 3(a) and the further image information inputted from the input device I is an image of a portrait of a human subject without any background view as shown in FIG. 3(b), the image information of the areas containing the human subject is detected through e.g. a difference in the color densities from the areas of the surroundings. Then, a portion of the image information of the landscape is substituted by this detected image information, thereby to produce a composite image as shown in FIG. 3(c).

After completion of the above-described calculation for the image composition, this composite image is displayed on the monitor device M (step #10). At this stage, if an instruction from the operator through the control panel O indicates that the operator has confirmed by viewing the display on the monitor device M that the displayed composite image matches the desired composite image (step #11), an exposure time period is calculated for each of the three primary color components with respect to each of the divided areas (step #12). Then, based on the results of these calculations, the printer paper 3 is exposed at the image-exposure section L in the above-described manner (step #13).

On the other hand, at step #11, if the instruction from the operator instructs an undoing of the image composition, the process returns to step #8 to undo the operations starting from the input operation of the image information at this step #8.

Accordingly, the roller 20, the roller 22, the motor M1 and the motor M2 together function as a transporter means for transporting the print paper 3 through the projection-exposure section P and the image-exposure section L. The control panel O functions as an exposure-mode instructing means for instructing a switchover between the projection-exposure mode and the image-exposure mode.

Next, some other embodiments of the invention will be specifically described.

(1) In the foregoing embodiment, the image information of the film image read by the image sensor 15 is composed with the image information inputted from the input device I. Instead, the image information of the film image may be stored in advance in the memory 40. Whereas, a further film image is read by the image sensor 15. So that, this further film image and the image information of the foregoing film image pre-stored in the memory 40 may be composed with each other to produce a composite image.

(2) In the foregoing embodiment, the image printer 1 is adapted to be switchable between the two modes of the projection-exposure mode and the image-exposure mode. In addition to these, the image printer may be provided further with a double-exposure mode in which the exposure at the projection-exposure section P and the further exposure at the image-exposure section are effected in an overlapped manner.

Figure 4:
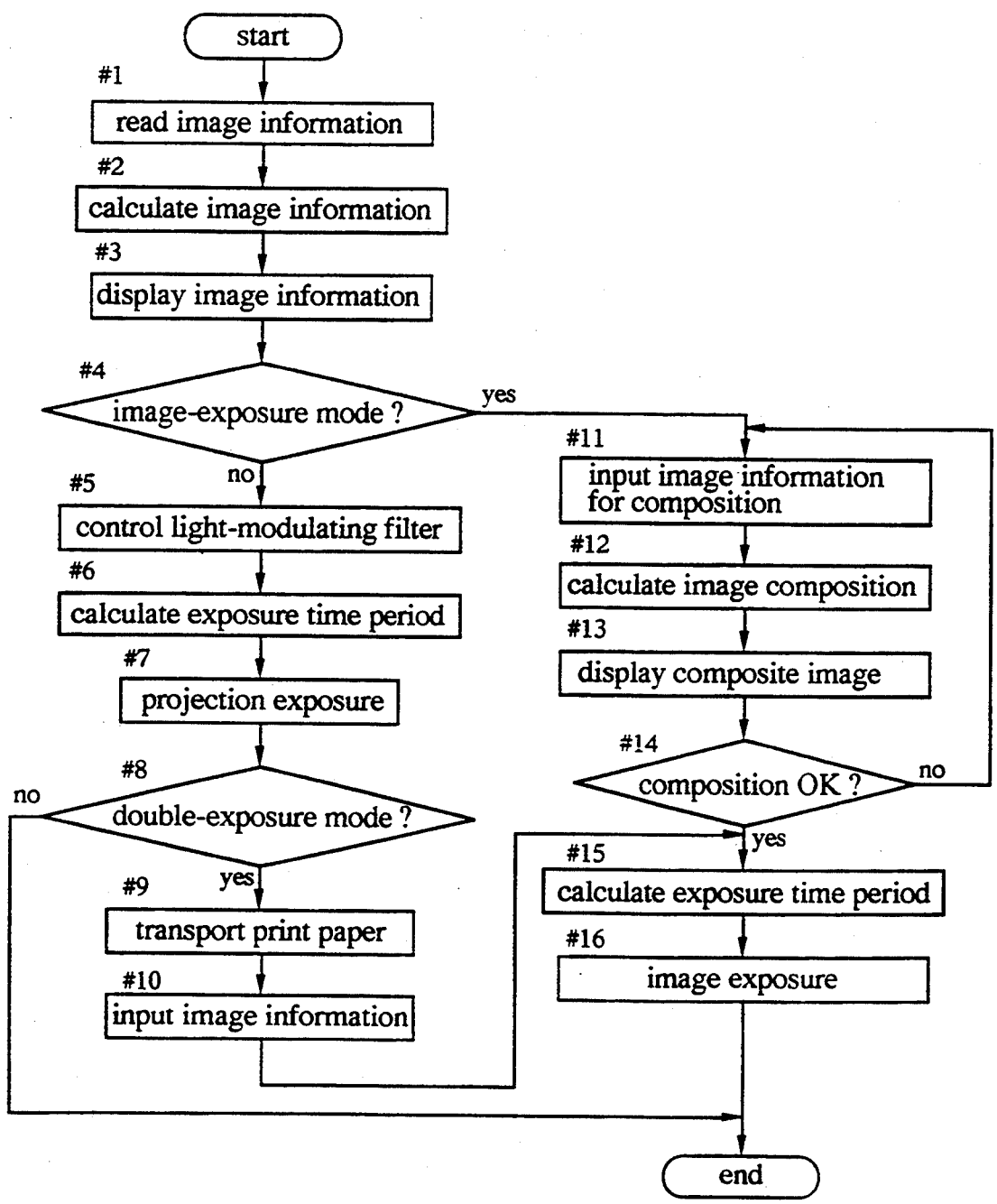
FIG. 4 is a flow chart relating to a further embodiment of the invention.

Then, control operations of the control unit C including the double-exposure mode will be described next with reference to a flow chart of FIG. 4.

In this case, the control operations when the projection-exposure mode or the image-exposure mode is instructed from the control panel O are effected in substantially the same manners as described in the foregoing embodiment. In case the double-exposure mode is instructed, the process branches from step #4 to step #5. First, the projection-exposure of the image of the film 2 onto the print paper 3 is effected at the projection-exposure section P (steps #5 through #7). Then, in this case of the double-exposure mode, the process branches from step #8 to step #9, at which the motor M1 and the motor M2 are activated to transport the print paper 3 until the projection-exposed portion of this print paper 3 reaches the position of the PLZT print head 36 of the image-exposure section L (step #9).

Thereafter, the image information is inputted from the input device I (step #10), and exposure time periods are calculated to double-expose the print paper 3 (step #15 and step #16).

In the above-described manner, the double-exposure at both the projection-exposure section P and the image-exposure section L is effected.

(3) In the foregoing embodiment, the image-exposure section L uses the light shutter comprised of PLZT. Instead, a light shutter comprised of liquid crystal elements or the like may be employed as the print head. Further, by using a CRT or the like, the exposure may be effected with the print paper 3 being maintained stationary.

(4) In the foregoing embodiment, as the image information to be composed with the image information read by the image sensor 15, the image information inputted from the input device I comprising the image scanner is used. Alternatively, image information produced by a computer may be inputted through a communication interface to the control unit C.

(5) In the foregoing embodiment, in the course of the image composition, a portion of the image information to be used for the image composition is selected through e.g. the color density difference. Instead, the area of the image information to be used for the image composition may be designated on the display of the monitor device M by input means such as a touch-operation panel or a mouse device.

(6) In the foregoing embodiment, at the image-exposure section L, the irradiation light beam from the exposure light source 30 is guided by the optical fiber bundle 35 to the PLZT print head 36. Instead, the irradiation light beam from the exposure light source 30 may be converged by e.g. a lens to the PLZT print head 36.

(7) In the foregoing embodiment, in the course of the exposure of the print paper 3 at the image-exposure section L, the exposure operation of one-line amount and the transportation operation of one-line amount are alternately repeated to effect the exposure of each line of the image information. Instead, it is conceivable to expose in succession the respective lines of the image information while continuously transporting the print paper 3 at a predetermined constant speed.

The invention may be embodied in other specific forms without departing from the sprit or essential characteristics hereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An image printer comprising:
   a projection-exposure section for projecting and exposing a film image onto a photosensitive material;
   an image-exposure section for exposing the photosensitive material based on exposing image information with setting an exposure amount for each of a plurality of areas of the exposing image information;
   reader means for reading the image information of the film image with the image information being divided into the plurality of areas; and
   transporter means for transporting the photosensitive material through the projection-exposure section and the image-exposure section;
   said image-exposure section being operable to compose a plurality of kinds of image information read by said reader means so as to generate the exposing image information comprising the image information of one kind with a component thereof replaced by a component of the image information of another kind, or operable to compose the image information read by said reader means with further image information either stored in advance in the image-exposure section or inputted from input means so as to generate the exposing image information comprising the image information read by said reader means with a component thereof replaced by a component of said further image information.

2. An image printer as defined in claim 1, wherein said reader means is operable to irradiate white light onto the film and measuring, by e.g. a CCD line sensor, intensity of its reflected or transmission light, with the light being decomposed into three primary colors of red, green and blue.

3. An image printer as defined in claim 1, wherein said image-exposure section includes an exposure light source, an IR cut filter for eliminating infrared beam component from the light emitted from the light source, a shutter, a light-modulating filter for adjusting color balance of the light emitted from the light source, a PLZT print head, and an optical fiber bundle for trasmitting the light from the exposure light source to the PLZT print head.

4. An image printer as defined in claim 3, wherein said exposure light source, said IR cut filter, said shutter, and said light-modulating filter together with a cooling fan motor are accommodated within a single casing.

5. An image printer as defined in claim 1, wherein said input means comprises an image scanner for scanning and reading various kinds of image information, with the information being divided into a great number of areas, said input means being operable to convert the read information into density information of the three primary colors of red, green and blue for each area and to transmit this information to a control unit.

6. An image printer as defined in claim 5, wherein said control unit includes a memory for storing a program for controlling the operations of said various components and a variety of image information including the image information inputted from said input means, and exposing image information generated through an image composition.

7. An image printer as defined in claim 1, further comprising:
   a control unit for controlling operations of the projection-exposure section, the image-exposure section and the transporter means; and
   an exposure-mode instructing means for instructing the control unit to switch over between a projection-exposure mode and an image-exposure mode;
   wherein, when the exposure-mode instructing means instructs the projection-exposure mode, the control unit effects a control scheme to allow the photosensitive material to be exposed at the projection-exposure section alone: and, when the exposure-mode instructing means instructs the image-exposure mode, the control unit effects a further control scheme to allow the photosensitive material to be exposed at the image-exposure section alone.

8. An image printer as defined in claim 7, wherein said image-exposure section is rendered switchable between a composite mode in which the plurality of the image information are composed with each other to generate the exposing image information and a non-composite mode in which pre-stored image information or image information inputted by a further input means is used as the exposing image information, and wherein said exposure-mode instructing means is operable to instruct a double-exposure mode in addition to the projection-exposure mode and the image-exposure mode, such that, with an instruction for the double-exposure mode, the control unit effects a still further control scheme in which the photosensitive material is subjected to the exposure at the projection-exposure section and a further exposure under the non-composite mode at the image-exposure section in an overlapping manner.

9. An image printer as defined in claim 8, wherein said reader means is operable to irradiate white light onto the film and measuring, by e.g. a CCD line sensor, intensity of its reflected or transmission light, with the light being decomposed into three primary colors of red, green and blue.

10. An image printer as defined in claim 8, wherein said image-exposure section includes an exposure light source, an IR cut filter for eliminating infrared beam component from the light emitted from the light source, a shutter, a light-modulating filter for adjusting color balance of the light emitted from the light source, a PLZT print head, and n optical fiber bundle for transmitting the light from the exposure light source to the PLZT print head.

11. An image printer as defined in claim 10, wherein said exposure light source, said IR cut filter, said shutter, and said light-modulating filter together with a cooling fan motor are accommodated within a single casing.

12. An image printer as defined in claim 8, wherein said input means comprises an image scanner for scanning and reading various kinds of image information, with the information being divided into a great number of areas, said input means being operable to convert the read information into density information of the three primary colors of red, green and blue for each area and to transmit this information to a control unit.

13. An image printer as defined in claim 12, wherein said control unit includes a memory for storing a program for controlling the operations of said various components and a variety of image information including the image information inputted from said input means, the image information read by said reader means, and exposing image information generated through an image composition.

14. An image printer as defined in claim 1, wherein said printer is switchable between a state for guiding the photosensitive material along a straight path and a further state for forming the photosensitive material into a loop so as to allow a transporting speed of the photosensitive material at said projection-exposure section and that at said image-exposure section to be set independently of each other.

* * * * *